Patented Mar. 21, 1939

2,151,029

UNITED STATES PATENT OFFICE 2,151,029

METHOD OF COMPLETING OIL OR GAS WELLS

Jan Vander Henst, Houston, Tex., assignor to Gulf Oil Corporation, Pittsburgh, Pa., a corporation of Pennsylvania No Drawing. Application April 28, 1936, Serial No. 76,872

8 Claims. (Cl. 166—21)

This invention relates to drilling and completing wells; and it comprises an improvement in methods of drilling and completing oil or gas wells which includes the step of circulating down through the well a substantially solid-free liquid emulsion of oil and water which is less dense and more viscous than either oil or water alone, whereby cuttings or sand are effectively carried up out of the well and fluid-locking of producing formations is prevented; all as more fully hereinafter set forth and as claimed.

In drilling wells for oil and gas, and particularly when rotary methods are used, it is customary to circulate a fluid through the well and around the drill during the drilling operation. Usually, the drilling fluid is an aqueous suspension of solid colloidal matter such as clay, bentonite, etc. These suspensions are known generally as mud fluids, and they serve to lubricate and cool the drill, to deposit solid or gelatinous matter on the well walls thus preventing loss of fluid into the formations adjoining the well and to carry up drill cuttings and sand to the surface of the well for removal.

Another important function of the well fluid is to maintain a hydrostatic pressure on the lower portions of the well. The column of fluid exerts a pressure in the well corresponding to the density of the fluid and the height of the column. The pressure exerted by the column prevents escape of gas and oil into the well prior to completion of drilling operations.

All muds are heavier than water. Densities of unweighted muds range from 9.3 to 10.8 pounds per gallon and of weighted muds (e. g. muds in which iron oxid or barytes is incorporated) range from 10.5 pounds up. Water has a density of 8.3 pounds per gallon.

Mud fluids, when properly prepared, serve their purpose well prior to the time when the drill enters the oil or gas producing formation. However, in drilling into producing formations, it is common practice to substitute either oil or water for the drilling mud for the reason that the water or oil, having no clay content, does not tend to plug or block flow through the small channels entering the bore hole. When mud is used, it is apt to reduce potential production by such plugging and in addition it will partially or completely plug the strainer customarily set at the bottom of the well after drilling is completed. Neither water nor oil has this disadvantage, but each is of lower viscosity than the usual drilling muds, and accordingly they are less satisfactory in raising cuttings and debris, etc., to the surface. This defect is accentuated when the formations being drilled are of dense character. The low viscosities of water and oil are also disadvantageous in that they permit penetration of water, gas, and oil bearing strata with consequent need for replacement of fluid being continually lost from the bore. Water has the additional disadvantage of tending to disintegrate certain formations, e. g. shales.

Water is a particularly poor fluid for drilling into an oil or gas sand. An oil sand that is impregnated with water may become "fluid-locked"; the free flow of oil is retarded and the rate of production from the well is reduced. Gas bearing sands may also be adversely affected by impregnation with water. It is well known that the productivity of a gas well may be seriously reduced by allowing it to become flooded with water. Furthermore, in washing or at other times when water is used, it will channel through the mud instead of displacing it with the result that the well walls and strainer face are not properly cleaned.

I have developed a method of completing oil and gas wells, with the aid of a substantially solid-free emulsion of oil and water which is circulated down the well during the operations of drilling into the producing formation and when setting the strainer. The emulsion fluid employed is much more viscous than either oil or water alone; hence it has a greater carrying capacity for cuttings, etc. Furthermore, the density is relatively low; viz., between that of oil and of water; hence penetration into the producing formations is minimized. In some instances, I find it advantageous to further increase its viscosity and hence the carrying capacity of the emulsion fluid by adding to it a small amount of bentonite, say, between 0.5 and 1.5 per cent by weight. My emulsions without bentonite usually have viscosities (conveniently determined by the funnel method as described post) in the range 30 to 35 seconds (funnel) at a temperature of 80–90° F., and, with bentonite, in the range 35 to 40 seconds.

The following table shows comparative viscosities and densities of my fluids, and of known fluids, all at the same temperature (80–90° F.).

| Fluid | Viscosities | Density |
|---|---|---|
| | Seconds | Pounds per gallons |
| Emulsion (present invention) | 30–35 | 7.0– 8.0 |
| Emulsion with 0.5–1.5% bentonite (present invention) | 35–40 | 7.0– 8.0 |
| Crude oil | 22–25 | 6.6– 7.2 |
| Water | 28 | 8.3 |
| Thin mud | 38–42 | 9.3– 9.5 |
| Normal mud | 42–50 | 9.5–10.5 |
| Heavy mud | 50 up | 10.5 up |

In practicing my invention I prepare an emulsion of soft water and crude oil. Advantageously this may be accomplished by mixing 55 parts of soft water, 45 parts of crude oil and 1 part of 98 per cent concentrated sulfuric acid in a jet apparatus adapted for preparation of emulsions, such as a "high-speed hopper". A high-speed hopper consists of a hopper or funnel with a small nozzle at the lower end thereof, connected into the discharge line of a pump. A high fluid velocity through the nozzle causes a turbulent flow resulting in intimate mixture of the pump discharge and the materials added through the hopper. The resulting emulsion is of the water-in-oil type: water is present as the dispersed phase, while the oil forms the continuous phase. Such an emulsion is stable and is ordinarily of sufficiently high viscosity to raise cuttings. Sometimes I enhance the viscosity of the fluid by adding bentonite thereto in amounts usually between 0.5 and 1.5 per cent of the total weight of the emulsion; the bentonite being added to the water before emulsification with the oil. This expedient is useful when formations of very high density are encountered. The dense cuttings tend to rapidly settle out of thin fluids.

While the above proportions have been found most suitable when using crude from one particular locality, the invention is not to be regarded as confined to these proportions. Crudes from different sources vary in composition and in their tendency to form stable emulsions with water. Well conditions likewise vary. Sometimes it is desirable to employ a well fluid of one viscosity and sometimes of another, depending on the formation structure and the speed with which the well fluid may be circulated by the pumps. The object to be achieved is the provision of a well fluid of proper viscosity and density for the particular task at hand. Therefore, the proportions of ingredients must vary of necessity. With any given crude, the most desirable proportions to use may be quickly and readily determined empirically.

In a typical rotary drilling operation utilizing in the final stages the fluid of the present invention, the well is first drilled down to, or nearly to, the producing horizon in the usual way; a suitable mud fluid, which may be weighted, being circulated down the drill pipe and up between the pipe and the well bore. When drilling records indicate that the top of the producing formation is encountered, if the formation pressure is low the drilling mud in use can be replaced by emulsion and the well washed therewith. Sometimes this is not feasible because of danger of a blowout from high pressure exerted on the fluid column by gas in the formation, in which case mud is used until the final stages.

When the well has been drilled to the proper depth, the drill pipe is removed and a strainer is lowered to the bottom of the well. After the strainer is lowered the drilling mud is diluted with water, then the strainer is washed with the oil-water emulsion. In some cases, where shale or other readily disintegrable materials are absent, the strainer and well face can be first washed with pure water, followed by displacement of the water with oil-water emulsion.

A strainer is a piece of pipe slightly less in outside diameter than the diameter of the bore hole, the pipe being perforated to allow flow of oil. It is arranged so as to project upwardly through the producing formation and into the last string of casing, just above the oil bearing sand. The perforated section is usually wrapped with wire to restrict the openings to about 0.009 inch in diameter for the purpose of restricting entrance of solid particles to the well casing or tubing.

The strainer is lowered into the producing formation either on the end of a string of tubing or on the drill pipe and rests on the bottom of the hole. The lowermost portion of the strainer is provided with one or more back pressure valves so arranged that when liquid is introduced through a wash pipe, it may leave the strainer through vents at the bottom; but, when the washing is completed, the valve will seat and prevent the well fluid from entering the strainer other than by way of the screened portion. Near the upper extremity of the strainer, a packer is provided for forming a seal between the outside of the strainer and the inside of the well casing at the desired level. The packer may be set with a device known as a setting tool which is operated by rotating the drill pipe or tubing depending upon which carries the strainer.

With the strainer in the bottom hole and the packer unset, according to the invention the emulsion is introduced through the drill stem or tubing into the wash pipe. The emulsion passes through the back pressure valve in the strainer and washes the strainer face and formation face, returning to the casing through the annulus between the strainer and casing. When the returns at the top of the well indicate that the hole and strainer are properly cleaned, oil alone is introduced through the wash pipe to displace emulsion in the producing area, after which the packer is set, thus sealing off the annulus between casing and strainer, whereby liquid leaving the hole is forced to pass through the strainer screen and hence into the tubing. The well is then allowed to flow or is pumped according to existing conditions.

Both oil-in-water and water-in-oil emulsions are within the purview of my invention. Water-in-oil emulsions are most useful in carrying material from the hole and in assisting in completion. Oil-in-water emulsions are most useful in cleaning the hole and the face of the producing formation. I use the expression "water and oil emulsion" to include both types.

It is often advantageous to have a little soft asphalt in the fluid. The best way to incorporate asphalt in the fluid is to dissolve the required amount in a barrel or so of warm crude oil (about 90°–100° F.) and mix this solution with the oil prior to emulsification with water.

Suitable water to oil ratios ordinarily lie within the limits indicated below:

Oil (34–40° Bé.) _ 60 parts by volume
Water _____ 40 parts by volume
Asphalt _____ 1 to 2 parts by weight on the total emulsion These proportions being for the lighter oils, and Oil (26–32° Bé.) _ 40 parts by volume
Water _____ 60 parts by volume
Asphalt _____ 0.5 to 1 part by weight on the total emulsion These proportions being for the heavier oils.

Most field crudes emulsify readily with acidified water. Many crudes will emulsify with plain water, though more time for agitation is required. Crudes of gravity less than 32° Bé. having added asphalt emulsify readily with plain water when agitated therewith.

In making oil-in-water emulsions common sodium and potassium soaps, e. g. sodium oleate, can be used as emulsifying agents in lieu of sulfuric acid, and in making water-in-oil emulsions asphalt or bentonite can be used. However, sulfuric acid is usually best for reasons of cheapness and convenience. Furthermore, it is easy to dispose of emulsions made with the aid of sulfuric acid. Often they can be readily broken simply by adding warm salt water. This is a controlling reason for its use in many cases.

The following examples of specific embodiments of the invention illustrate its application to typical well drilling operations.

(1) In cleaning a certain South Texas new well of drill cuttings prior to setting the strainer, a water-in-oil emulsion was made by passing local crude oil into water softened with caustic soda, in a high speed hopper. Sulfuric acid was added to the mixture, and on agitation a stable emulsion formed. This was circulated through the hole to clean it prior to setting the strainer.

(2) In a certain other well, it had been previously attempted to complete the well with the aid of an ordinary drilling mud. Oil rose only to within 2500 feet of the surface and the level remained stationary at that depth. The well was then recompleted using an oil and water emulsion in accordance with the invention. The emulsion was made by simply agitating the local crude oil with softened water, using a high speed hopper, no emulsifying agent being added. The emulsion consisted of 55 parts water and 45 parts oil by volume and had a density of 7.6 to 7.8 pounds per gallon. The well immediately on completion flowed 170 barrels of pipe line oil per day. I attribute this improvement to the fact that my emulsion was viscous enough to carry up all cuttings yet had no tendency to water-log or plaster the producing formations.

(3) A certain well in Louisiana had been reworked and reset several times by usual methods without successful completion. The producing formation was calcareous sand. Then, in accordance with the invention the well was completed with an oil-in-water emulsion made by acidifying water with sulfuric acid and then adding local crude oil thereto. The well was washed down with emulsion, the strainer set with emulsion, and the well completed as a pumper which produced 35 barrels of pipe line oil per day. The acid in this emulsion served an important additional function. The old strainer that had been set in the well in the prior unsuccessful attempts at completion, showed a considerable amount of calcite, $CaCO_3$, on the strainer face. The acid removed the calcite from the calcareous sand particles, allowing oil to enter the strainer. It may be pointed out that this neutralization of part of or all the acid of the emulsion does not destroy the stability of the emulsion. The main function of the acid is in initially promoting emulsification.

(4) Another Louisiana well with the original strainer-setting would not produce. This was a full hole cementing job and apparently cement had covered the outside face of the strainer. Accordingly, the original strainer was perforated (drilled through) and an inside strainer was set with the aid of an acidized oil-in-water emulsion circulated as described. The well was completed flowing 140 barrels of pipe line oil per day.

Two simple tests for determining whether an emulsion is of the water-in-oil type or of the oil-in-water type are as follows:

Examine the emulsion under a microscope while stirring a little oil or a little water into the emulsion. The liquid which forms the external phase of the emulsion mixes readily with the emulsion while the liquid which forms the internal phase does not.

A water-in-oil emulsion will leave a slight oil stain on blotting paper, while oil-in-water merely gives a wetting of the paper.

Other oils than crude mineral oil may be used in making the emulsion of my invention, for example castor oil, but as crude oil is usually readily available at the site of operation and as it is the cheapest material for other reasons, it is usually advantageous to employ crude oil rather than other oils.

The funnel method of viscosity measurement is convenient for measuring relative viscosities of drilling fluids.

In determining the comparative viscosities of the various fluids tabulated ante, a funnel viscosimeter was employed. The funnel was in the form of an inverted frustum of a cone, 6 inches internal diameter at the (open) top, $\frac{3}{32}$ inch internal diameter at the bottom, 11¾ inches in altitude and having walls 12 inches long. The lower end had a cylindrical spout of $\frac{3}{32}$ inch internal diameter and 2 inches long, merging with the cone opening. The funnel held 3 pints. In carrying out a test, three pints of fluid were poured into the funnel, and the time required for one quart to drain out of the spout was noted, this time (in seconds) being a measure of the viscosity. The temperature was 80–90° F.

What I claim is:

1. In completing oil or gas wells having a producing formation, the improvement which comprises circulating down through the well a fluid emulsion of oil and water, substantially free of solid matter and having a viscosity greater than that of either crude oil or water, and a density less than that of water, whereby rock particles and sand are carried up by the circulating fluid, while tendency of the fluid to enter the producing formation under hydrostatic pressure is minimized.

2. The method of claim 1, wherein the emulsion is a water-in-oil emulsion.

3. In setting well strainers in a calcareous producing formation in an oil or gas well, the improvement which comprises circulating through the strainer and up through the well a substantially solid-free emulsion of oil in acidified water, having a viscosity greater than that of either crude oil or water and a density less than that of water and having the external phase of the emulsion sufficiently acidic to attack calcite, whereby solid matter is washed from the strainer and carried upward, while penetration of the emulsion into the producing formation is minimized.

4. In completing oil or gas wells in a calcareous formation, the improvement which comprises the step of circulating in the well a substantially solid-free oil-in-water emulsion having a viscosity greater than that of either crude oil or water and having the external water phase of the emulsion sufficiently acidic to attack calcite.

5. The method of claim 1 wherein the fluid emulsion contains a modicum of asphalt as stabilizer.

6. The method of claim 1 wherein the fluid emulsion contains a modicum of concentrated sulfuric acid as stabilizer.

7. The method of claim 1 wherein the fluid emulsion contains 0.5 to 1.5 per cent by weight of bentonite in suspension to increase the viscosity of the emulsion.

8. The method of claim 1 wherein the fluid emulsion contains 60 to 40 parts of oil and 40 to 60 parts of water by volume.

JAN VANDER HENST.